April 28, 1970 H. CZERNY 3,509,485

VANE CONTROLLED OSCILLATOR LINEAR INDUCTIVE TRANSDUCER

Filed Nov. 21, 1967 3 Sheets-Sheet 1

Heribert Czerny
INVENTOR.

BY
Darbo, Robertson &
Vandenburgh Attys

Heribert Czerny
INVENTOR.

BY
Darbo, Robertson & Vandenburgh
Attys

April 28, 1970 H. CZERNY 3,509,485

VANE CONTROLLED OSCILLATOR LINEAR INDUCTIVE TRANSDUCER

Filed Nov. 21, 1967 3 Sheets-Sheet 3

Heribert Czerny
*INVENTOR.*

BY
Darbo, Robertson & Vandenburgh Attys

United States Patent Office 3,509,485

Patented Apr. 28, 1970

3,509,485

VANE CONTROLLED OSCILLATOR LINEAR INDUCTIVE TRANSDUCER

Heribert Czerny, Dusseldorf-Nord, Germany, assignor to W. H. Joens & Co. G.m.b.H., Dusseldorf, Germany Filed Nov. 21, 1967, Ser. No. 684,851

Claims priority, application Germany, Nov. 23, 1966, J 32,319

Int. Cl. H01f *21/10;* H03b *5/12*

U.S. Cl. 331—65 7 Claims

ABSTRACT OF THE DISCLOSURE

The two inductors of an oscillator for an inductive transducer comprise two coils separated by a narrow air gap, the said coils being elongated in the direction of movement of a control vane arranged to dip into the gap for damping the oscillations and the coils being provided at their ends with field concentrating inserts so that the relationship between travel of the control vane and the output signal of the oscillator is linear over a relatively wide range.

Figure 1:
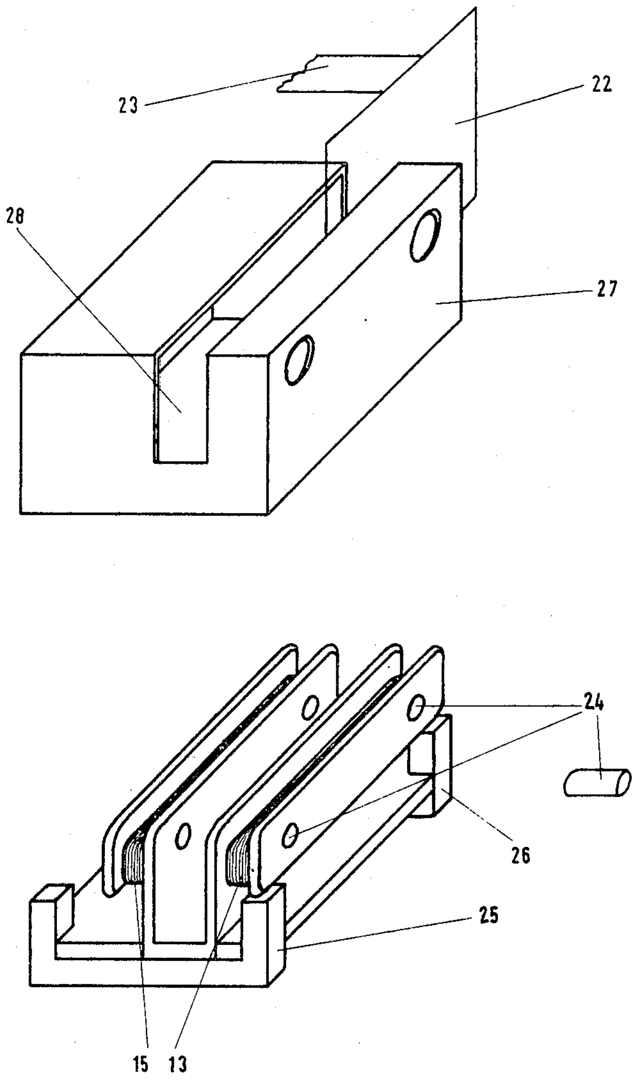

The invention relates to an inductive transducer with an oscillator comprising two inductances separated by a narrow air gap, a control vane of electrical high conductivity material dipping into said air gap for damping the oscillator.

The prior art discloses inductive pick ups which are based on this principle. The control vane of such a system in an on-off controller is disposed on the pointer of a measuring instrument. The inductances are mounted on a set-value pointer. Dipping of the control vane between the two inductances is accompanied by a practically sudden change of the oscillator output signal, that is to say, the oscillator output signal varies from one limiting value (undamped oscillation) to the other limiting value (full damping, vane between inductances) when the control vane traverses a negligibly small distance. This known apparatus, however is neither intended for nor suitable for producing a signal which varies constantly in proportion with the vane travel for the purpose of analogue measurement of the vane travel.

Other principles have hitherto been employed for transducers, that is to say, apparatus in which the position of an element (control vane) is converted into an analogue electrical quantity when said element traverses a relatively long distance. The prior art discloses optical transducers. However, an optical system is normally sensitive to vibration. Moreover, optical transducers are sensitive to deposits of dust and dirt. Magnetic-inductive transducers are also known in which ferro-magnetic elements displace a magnetic flux or produce a change of self-inductance of coils. Such transducers suffer from the disadvantage that they require control vanes of a material of relatively large density. In many cases this results in diffiulties, particularly if only small regulating forces are available or, if, for example, it is necessary for the pointer supporting the control vane to come to rest rapidly. The prior art also discloses inductive transducers in which the oscillator is damped by the control vane. These known inductive transducers can be operated with control vanes of material having relatively small density but they do not provide a linear relationship between control vane travel and output signal. In such systems the control vane approaches axially to a damping coil which belongs to the oscillator. Matching to the natural characteristic of the systems must then be provided by a subsequent amplifier.

By contrast, it is the object of the invention to provide an inductive transducer which operates in accordance with the principle of oscillator damping, so that vanes of relatively lightweight material may be employed but where the oscillator exhibits a substantially linear characteristic.

To this end, a system of the kind mentioned heretofore and supplying only a yes-no signal of known kind is modified according to the invention in that the inductances are formed by coils which are elongated in the direction of the movement of the control vane and have field concentrating inserts at their ends, so as to provide over a relatively large range a linear relationship between displacement and control vane and output signal of the oscillator.

It is advantageous if the output signal U is derived from the DC input resistance of the oscillator. Under these conditions, no high frequency signal will be tapped off but instead use is made of the fact that the current consumption of the oscillator increases and accordingly the input resistance for the driving DC voltage decreases, in accordance with the increase in oscillator amplitude, or vice versa.

Figure 2:
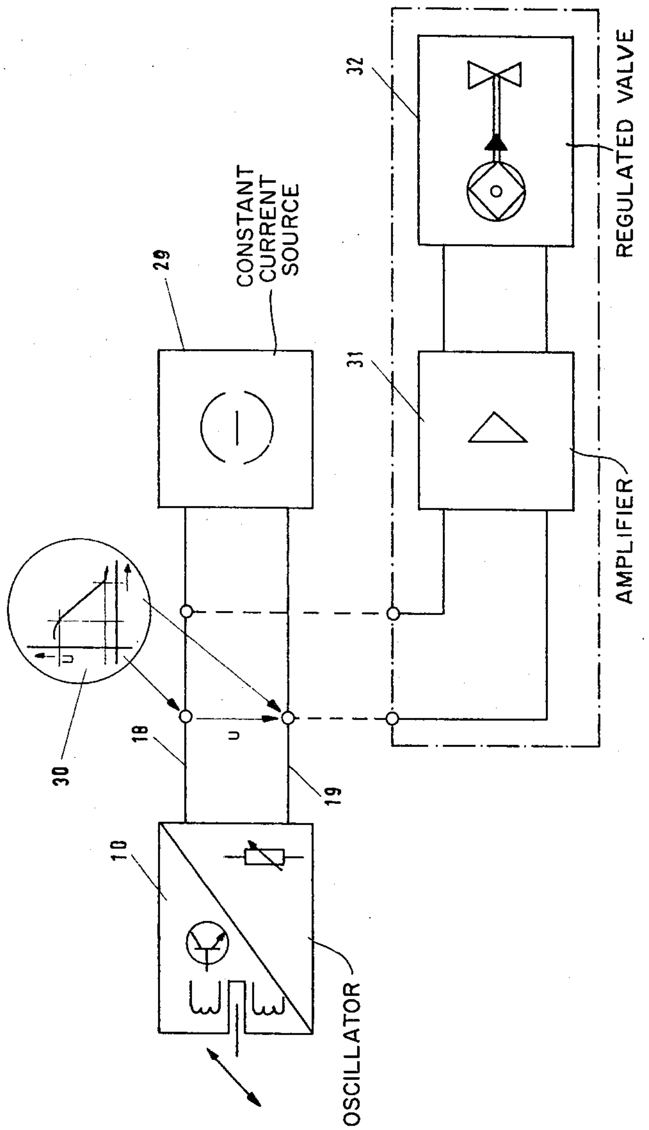
Figure 4:
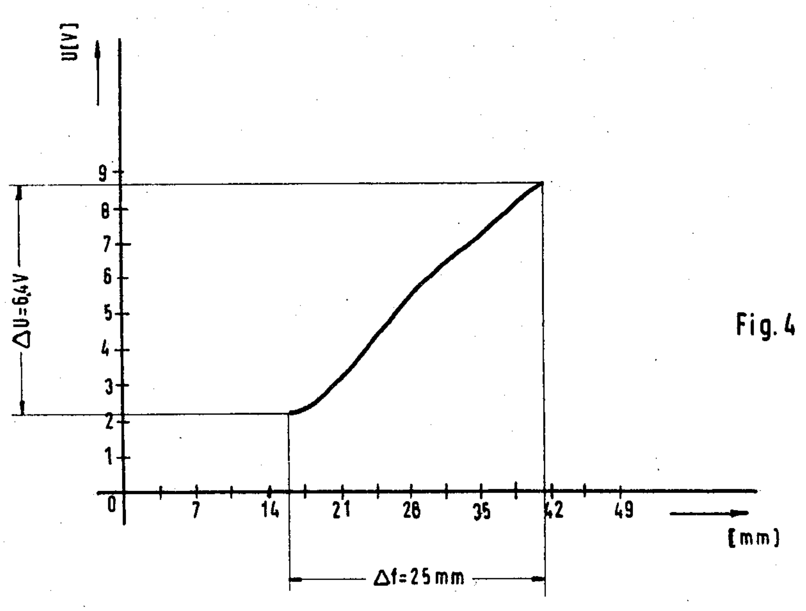
Figure 3:
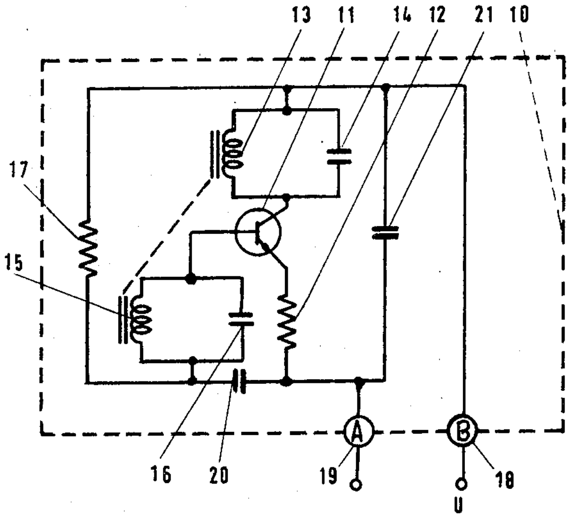

An embodiment of the invention will now be described by way of example with reference to the accompanying drawings in which:

FIGURE 1 is an exploded perspective view of a coil arrangement of an inductive transducer according to the invention, FIGURE 2 is a block circuit diagram of an inductive transducer according to the invention, FIGURE 3 is a circuit diagram of an oscillator to be used for the transducer according to the invention, FIGURE 4 is an oscillogram recorded with an experimental rig showing the output voltage U as a function of the vane travel with the illustrated embodiment.

An oscillator used for the transducer according to the invention is illustrated in FIGURE 3 and is generally referred to with the numeral 10. It incorporates a transistor 11 with a resistor 12 in the emitter circuit and a parallel oscillating circuit comprising an inductor 13 and a capacitor 14 in the collector circuit. A second parallel oscillating circuit is connected to the base of the transistor 11, said second oscillating circuit comprising an inductor 15 and a capacitor 16. The base of the transistor 11 is connected via the aforementioned oscillating circuit, and a non-inductive resistor 17 to one of the input terminals 18 for the direct current feed, while being DC isolated from the other terminal 19 by a capacitor 20. A capacitor 21 connected between terminals 18 and 19 blocks high-frequency currents from the aforementioned terminals.

The two inductors 13 and 15 are constructed as coaxial, elongated coils (FIG. 1) between which a gap is formed. An aluminum vane 22, mounted on a pointer 23 and guided thereby through the gap, dips therein. Ferrite rods 24 are positioned as field concentrating means, approximately at the curvature centres of the coils. To permit precise adjustment of the transducer characteristic, said ferrite rods may be adapted to be adjustable. U-shaped bars 25, 26 of field-concentrating material extend over the coils 13, 15. The coil system 13, 15 with the bars 25, 26, as well as with the other circuit elements—not shown in FIG. 1—of the oscillator 10 are enclosed by a housing 27 of screening material, said housing having a slot 28. The vane 22 traverses between the coils 13 and 15 through the aforementioned slot 28.

FIGURE 2 illustrates the manner in which the system described heretofore is connected. The inductors 13 and 15 in conjunction with the capacitors 14 and 16, respectively, present tuned circuits which provide resonance and consequent oscillation. Feedback is obtained by the structure of the oscillator inductors 13 and 15 which provide mutual inductance which is varied by the position of the aluminum vane. The mutual inductance is obtained by reason of the proximity and orientation of the inductors, as illustrated. The oscillator 10 is fed via terminals 18 and 19 by a constant current source 29. As indicated in FIGURE 2, the DC voltage input represented by terminals 18 and 19 of the oscillator 10 functions as a variable resistance whose value depends on the oscillating condition of the oscillator 10. When the oscillator does not oscillate, it absorbs a substantial amount of power and the value of the input resistance is small relative to the constant current source. If, on the other hand, the oscillator is in oscillation, if, therefore, the vane 22 has moved out of the gap between coils 13, 15, the power consumption will be smaller and accordingly the value of the input resistance represented by the oscillator 10, relative to the constant current source 29 will be greater. The voltage U which appears across terminals 18 and 19 will therefore vary relative to the vane travel F in the manner shown diagrammatically at 30 in FIGURE 2. This relationship is illustrated once again in FIG. 4 in the form of a measured curve, The line being the range within which varied amplitude oscillation occurs. It can be seen that in the described arrangement and, particularly with the coil system as illustrated in FIGURE 1, the voltage U varies linearly with the vane travel over a distance $\Delta f$ of 25 millimetres—as in the example—while varying by $\Delta U$=6.4 v. The voltage U may be arranged to cause, as illustrated in FIGURE 2, setting of a valve via an amplifier 31, as indicated in FIGURE 2 at the numeral 32. The signal may be transmitted by unscreened twin conductors.

As used, the device is operated in the range of vane movement within which oscillation occurs. Within this range, the oscillator acts as a variable resistor across wires 18, 19. The position of the vane affects the amplitude of oscillation and the effective current resistance presented by the oscillator between wires 18, 19. To the extent that the vane is between the inductors to a lesser extent, the oscillator presents more effective resistance and the voltage across 18, 19 will be more. With the vane in a slot to a greater extent, the oscillator presents a lower effective resistance across wires 18, 19, and this is represented by a correspondingly lower voltage thereacross. The apparatus would not be used in a situation in which the oscillator was not oscillating, because at that situation there would be no change in the resistance across wires 18, 19.

What is claimed is:

1. In a vane controlled movement measuring apparatus having an oscillator with a pair of magnetically coupled inductors which control the oscillation of the oscillator and which form a transducer through which a control vane of high electrically conductive material moves along a given path, said inductors being positioned on opposite sides of said path, the improvement comprising:

said inductors including coils comprising windings formed about a central axis and having two dimensions as measured transversely to said axis, one of said two dimensions being substantially greater than the other of said dimensions, said coils being positioned with said axis approximately normal to said path and with said one of said two dimensions parallel to said path, each of said inductors having separate, field concentrating inserts extending therethrough, parallel to said axis and immediately adjacent the two ends of the coil between which said one of said two dimensions is measured.

2. An inductive transducer according to claim 1, characterised in that the field concentrating inserts are formed by mechanically adjustable ferrite rods disposed approximately in the curvature centres of the coil ends.

3. An inductive transducer according to claim 2, characterised in that the coil pair is shrouded by U-shaped bars of field concentrating material for the purpose of providing a magnetic circuit.

4. An inductive transducer according to claim 3, characterised in that the coils and bars are surrounded by a housing of screening material, while leaving free a slot between the coils to permit entry of the control vane.

5. An inductive transducer according to claim 1, characterized in that the oscillator has a DC input resistance and the output signal is obtained from the DC input resistance of the oscillator.

6. An inductive transducer according to claim 5, characterized in that the oscillator is operated by a constant current source and the voltage drop across the input of the DC voltage feed supplies the output signal for the transducer.

7. An inductive transducer according to claim 4, characterised in that the entire circuit elements of the oscillator are disposed in the housing.

References Cited

UNITED STATES PATENTS

| | | | |
|---|---|---|---|
| 2,985,848 | 5/1961 | Raffaelli | 331—181 X |
| 3,058,076 | 10/1962 | Hasler et al. | 336—87 X |

NATHAN KAUFMAN, Primary Examiner

S. H. GRIMM, Assistant Examiner

U.S. Cl. X.R.

331—117, 181; 336—84, 87, 98, 220